(12) United States Patent
Schuller et al.

(10) Patent No.: US 6,514,056 B1
(45) Date of Patent: Feb. 4, 2003

(54) PISTON PUMP

(75) Inventors: Wolfgang Schuller, Sachsenheim (DE); Beate Schumann, Boennigheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/720,114

(22) PCT Filed: Dec. 28, 1999

(86) PCT No.: PCT/DE99/04116

§ 371 (c)(1),
(2), (4) Date: Apr. 5, 2001

(87) PCT Pub. No.: WO00/65231

PCT Pub. Date: Nov. 2, 2000

(30) Foreign Application Priority Data

Apr. 22, 1999 (DE) .......................................... 199 18 124

(51) Int. Cl.⁷ ................................................ F04B 39/08
(52) U.S. Cl. ........................ 417/549; 417/470; 417/554; 417/55.1
(58) Field of Search .................................. 417/470, 549, 417/554, 555.1

(56) References Cited

FOREIGN PATENT DOCUMENTS

| DE | 41 07 979 A 1 | 9/1992 |
| IT | 0617200 A1 * | 3/1993 |

* cited by examiner

*Primary Examiner*—Charles G. Freay
*Assistant Examiner*—Emmanuel Sayoc
(74) *Attorney, Agent, or Firm*—Ronald E. Greigg

(57) ABSTRACT

A piston pump for a slip-controlled, hydraulic brake system of a vehicle. A hollow piston is provided with an inner piston seal that has a sealing lip. During an upward reciprocating motion of the piston, fluid can flow past the sealing lip in a direction of a piston inner (displacement chamber) and constitutes an inlet valve of the piston pump. During a downward movement of the piston the sealing lip is forced by pressure against an inner surface of the piston to prevent a flow of fluid past the sealing lip. The invention obviates the need for a separate inlet valve and makes it possible for the piston pump to be short in length.

6 Claims, 1 Drawing Sheet

PISTON PUMP

CROSS-REFERENCE TO RELATED APPLICATIONS

This application is a 35 USC 371 application of PCT/DE 99/04116 filed on Dec. 28, 1999.

The invention relates to a piston pump which is provided for use in a slip-controlled, vehicle hydraulic brake system.

Piston pumps of this kind are known in and of themselves. By way of example, reference is made to DE 41 07 979 A1. The known piston pumps have a cylindrical, pin- or bolt-shaped piston which is guided so that the piston can move axially in a pump housing. The piston can be guided directly in a pump bore in the pump housing, or a liner is inserted into the pump housing, with the piston guided inside the liner in an axially mobile fashion. The piston can be driven to execute a reciprocating stroke motion by means of a rotary-driven cam and this reciprocating stroke motion produces the delivery of fluid in an intrinsically known fashion, wherein with the provided use of the piston pump in a hydraulic vehicle brake system, the fluid is brake fluid.

In order to control a direction of a fluid flow through the piston pump, the known piston pumps have an inlet valve and an outlet valve, usually in the form of spring-loaded check valves.

ADVANTAGES OF THE INVENTION

In the piston pump according to the invention, at least one of the valves which control the through flow direction through the piston pump is replaced by a piston seal, which seals the piston in the pump housing or in the liner. The piston seal can be affixed to the piston or can also be affixed in a stationary fashion in the pump housing or the liner. The piston seal according to the invention is embodied so that the piston seal simultaneously functions as a check valve. The piston seal has a circumferential sealing lip which rests inside the pump bore of the pump housing, inside the liner, or against the piston. The fluid to be supplied acts on the sealing lip on both sides, wherein a pressure difference in one direction results in the fact that the sealing lip is lifted away from the pump bore, the liner, or the piston and the fluid can flow past the piston seal, whereas a pressure difference in the opposite direction presses the sealing lip against the pump bore, the liner, or the piston so that the sealing lip produces a seal. The piston produces the alternating pressure difference by means of its reciprocating stroke motion for delivering fluid.

The piston pump according to the invention has the advantage that at least one valve that controls the flow direction through the piston pump is replaced by a piston seal which is required anyway. It is therefore possible to eliminate a check valve, which includes a valve closing body, a valve closing spring, and a valve seat and whose parts must be manufactured and assembled. The piston pump according to the invention has fewer individual parts and the number of assembly steps required to assemble the piston pump is reduced.

Advantageous improvements and updates of the invention disclosed are the an object of the invention.

As set forth herein, the sealing lip is truncated, hollow, and conical; the sealing lip has the shape of a hollow cone, wherein the cone preferably tapers in the direction of its free edge. This shape of the sealing lip permits the desired flow past the sealing lip in one direction and produces a reliable seal in the opposite direction, even at high pressure.

According to one embodiment, the piston is embodied as a hollow piston; a displacement chamber of the piston pump, whose volume is compressed and expanded during the reciprocating stroke motion of the piston and as a result, produces the fluid delivery in an intrinsically known manner, is disposed inside the piston. This embodiment of the invention has the advantage that because the displacement chamber is accommodated inside the piston, the piston pump is small, in particular short in the axial direction. This embodiment of the invention allows the piston pump to be compact in structure.

In an embodiment set forth herein, a stationary inner part inside the pump housing protrudes into the piston, which is embodied as a hollow piston. The piston can move axially on the inner part. The inner part defines one end of the displacement chamber inside the piston. The displacement chamber is sealed by means of the piston seal, which is affixed to the inner part or to the inside of the piston and rests in a sealed fashion against an inside of the piston or against the inner part.

Preferably, the piston seal is of one piece with the inner part; the inner part including the piston seal is manufactured in one work cycle, for example in the form of an injection molded part made of plastic. This further reduces the manufacturing cost and the number of individual parts.

The piston pump according to the invention is provided as a pump in a hydraulic brake system of a vehicle and is used in the control of pressure in wheel brake cylinders. The abbreviations ABS, ASR, VDC, or EHB are used for such brake systems, depending on the type of brake system. In the brake system, the pump serves for instance to return brake fluid from a wheel brake cylinder or a plurality of wheel brake cylinders to a master cylinder (ABS) and/or to supply brake fluid from a storage tank into a wheel brake cylinder or a plurality of wheel brake cylinders (ASR, VDC, or EHB). The pump is required, for example, in a brake system with wheel slip control (ABS or ASR) and/or a brake system serving as a steering aid (VDC) and/or an electrohydraulic brake system (EHB). With wheel slip control (ABS or ASR), for example, a locking of the wheels of the vehicle during a braking event when there is strong pressure on the brake pedal (ABS) and/or a spinning of the driven wheels of the vehicle when there is strong pressure on the gas pedal (ASR) can be prevented. In a brake system that serves as a steering aid (VDC), a brake pressure is built up in one or more wheel brake cylinders independently of an actuation of the brake pedal or gas pedal, for instance to prevent the vehicle from breaking out of the path desired by the driver. The pump can also be used in an electrohydraulic brake system (EHB) in which the pump supplies the brake fluid into the wheel brake cylinder or cylinders if an electrical brake pedal sensor detects an actuation of the brake pedal or in which the pump is used to fill a reservoir of the brake system.

BRIEF DESCRIPTION OF THE DRAWINGS

The invention will be explained in detail below in conjunction with a preferably selected exemplary embodiment shown in the drawing. The sole FIGURE is an axial section through a piston pump according to the invention.

DESCRIPTION OF THE EXEMPLARY EMBODIMENT

Figure 1:
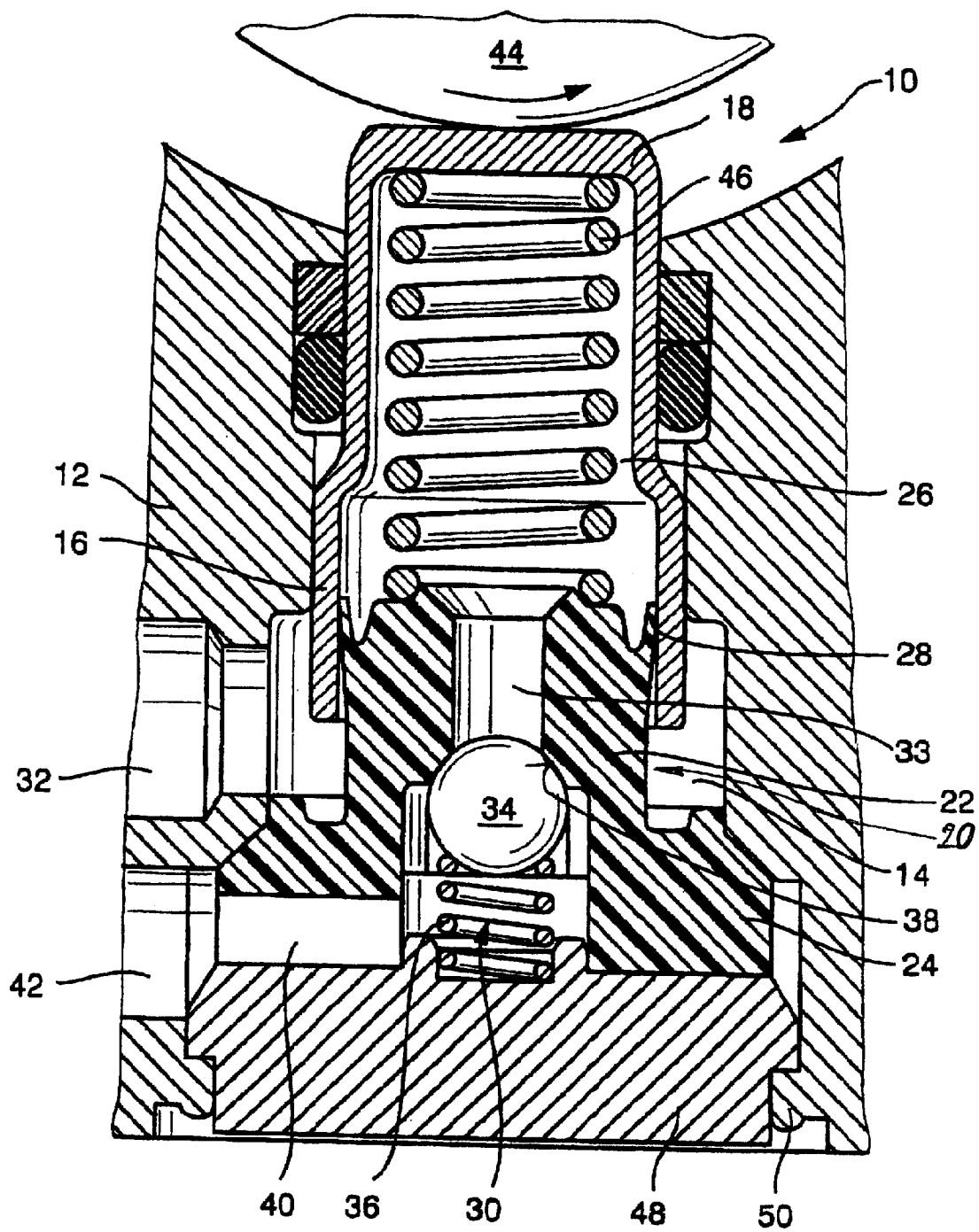

The piston pump 10 according to the invention shown in the sole FIGURE is inserted into a hydraulic block 12 which constitutes a pump housing and will be referred to as such below. For the sake of clarity, only a fraction of the hydraulic block 12 surrounding the piston pump 10 is shown in the drawing. The hydraulic block 12 is part of an otherwise not shown hydraulic brake pressure control circuit of a slip-regulated vehicle brake system. In addition to the piston pump 10, other hydraulic components, not shown, such as solenoid valves are inserted into the hydraulic block 12 and are hydraulically connected to one another and to the piston pump 10.

A stepped pump bore 14, in which a piston 16 is contained so that it can move axially, is let into the hydraulic block 12 that constitutes the pump housing. The piston 16 is embodied as a hollow piston; it is tubular and has a piston end wall 18, which is of one piece with the piston 16 and closes the piston 16 at one end. The other end of the piston 16 is open. The piston 16 is produced by means of non-cutting shaping, for example by means of cold forming, extrusion, or deep drawing.

An inner part 20, which is affixed in a stationary fashion in the pump bore 14 in the pump housing 12, has a pin 22 which protrudes into the piston 16. On its end protruding from the piston 16, the pin 22 is provided with a disk-shaped foot 24, which is of one piece with the pin and is used to fasten the inner part 20 in the pump bore 14. The pin 22 defines a displacement chamber 26 inside the piston 16 in the open end of the piston 16. An axially reciprocating stroke motion of the piston 16 causes a volume of the displacement chamber 26 to expand and contract, as a result of which fluid is supplied by the piston pump 10 in an intrinsically known fashion. In the exemplary embodiment shown, the inner part 20 is manufactured as an injection molded plastic part.

A circumferential piston seal 28 that is of one piece with the pin 22 is embodied on the outer circumference of the pin 22 of the inner part 20. The piston seal 28 rests in a sealed fashion against an inner circumference of the piston 16 and seals the displacement chamber 26. The piston seal 28 is embodied as a circumferential sealing lip which has the form of a truncated hollow cone, i.e. its outer and inner surfaces are conical. A free annular end of the sealing lip that constitutes the piston seal 28 points in the direction of the inner chamber of the piston 16, i.e. in the direction of the displacement chamber 26. On its fixed end, the piston seal 28 transitions in one piece into the pin 22 of the inner part 20. The piston seal 28 tapers at its fixed or pin end in the direction of its free end, whereas in the vicinity of its free, larger diameter end, it rests against the inner circumference of the piston 16 with a slight initial stress.

In addition to functioning as a seal, the piston seal 28 embodied as a sealing lip also functions as a check valve; it constitutes an inlet valve of the piston pump 10 according to the invention: fluid to be supplied by the piston pump 10, brake fluid in the exemplary embodiment shown, which is disposed in the pump bore 14 in the vicinity of the open end of the piston 16 acts on the outside of the piston seal 28. If, in a return stroke of the piston 16, the piston 16 is moved away from the foot 24 of the inner part 20, then a volume of the displacement chamber 26 increases inside the piston 16 embodied as a hollow piston. The volume increase of the displacement chamber 26 produces a negative pressure in the displacement chamber 26 in relation to the pressure in the pump bore 14 and consequently produces a pressure difference between the outside and inside of the piston seal 28, wherein the pressure on the outside is greater than the pressure on the inside. This pressure difference results in the fact that the piston seal 28 embodied as a sealing lip is pressed inward radially and is lifted away from the inner circumference of the piston 16. Brake fluid from the pump bore 14 flows past the piston seal 28 in the direction of the displacement chamber 26. The fluid flows between the piston seal 28 and the inner circumference of the piston 16, from the pump bore 14 and into the displacement chamber 26.

If, after the end of the return stroke, the piston 16 is moved in the direction of the foot 24 of the inner part 20 (delivery stroke), then the volume of the displacement chamber 26 is reduced. This produces an overpressure in the displacement chamber 26 in comparison to a pressure in the pump bore 14; a pressure acting on the inside of the piston seal 28 is greater than a pressure acting on the outside of the piston seal 28, as a result, the piston seal 28 rests in a sealed fashion against the inner circumference of the piston 16. During the delivery stroke, the brake fluid previously aspirated into the displacement chamber 26 is displaced (supplied) by means of an outlet valve 30 of the piston pump 10, which valve will be described below. Since the piston seal 28 rests with a slight initial stress against the inner circumference of the piston 16, the piston seal produces a seal even with equal pressure between the inside and outside of the piston seal 28 so that when there is equal pressure or a slight overpressure, leakage losses are prevented. A high overpressure in the displacement chamber 26 presses the piston seal 28 with great force against the inner circumference of the piston 16 so that even when there is a high overpressure in the displacement chamber 26, the displacement chamber 26 is securely sealed.

The inner part 20, which is of one piece with the piston seal 28, is comprised of polyamide 6.6, which is reinforced with 20% carbon fibers to increase its strength. Thus, a material is selected, which is sufficiently stable for the inner part 20 and combines the two properties of a sealing lip of the piston seal 28, which is elastic and therefore produces a reliable seal and is stable even when there is a high overpressure in the displacement chamber 26. The piston seal 28 can also be embodied as a separate sealing ring with a circumferential sealing lip and can be placed onto the pin 22 of the inner part 20 (not shown). The piston seal 28 can also be affixed to the piston 16 and can rest in a sealed fashion (not shown) against the pin 22, which in this instance must be embodied as cylindrical. It is also possible to orient the piston seal 28 in a manner opposite from the one shown so that its free end points away from the displacement chamber 26. In this instance, the piston seal 28 functions as an outlet valve of the piston pump 10.

The inlet of brake fluid into the pump bore 14 takes place by means of an inlet bore 32, which is let into the pump housing 12 radial to the pump bore 14 and feeds into the pump bore 14 in the vicinity of the open end of the piston 16. The outlet valve 30 is embodied as a spring-loaded check valve and is disposed inside the inner part 20. The inner part 20 is axially perforated by a center hole 33 in which the outlet valve 30 is accommodated. The center hole 33 widens out to form a conical valve seat 38 in the direction of the foot 24 of the inner part 20. The outlet valve 30 has a valve ball 34 as a valve closing body, which is pressed against the conical valve seat 38 by a helical compression spring which constitutes a valve closing spring 36.

Brake fluid, which is displaced from the contracting displacement chamber 26 during the delivery stroke of the piston 16, flows through the outlet valve 30 embodied as a check valve and travels through three outlet conduits 40 let into the foot 24 of the inner part 20 in the shape of a star, and travels into an outlet bore 42 which is let into the pump housing 12 radial to the pump bore 14.

The piston 16 is driven to execute its axially reciprocating stroke motion by means of a cam 44, which can be driven to rotate by an electric motor, and the piston 16 rests with its piston end wall 18 against the circumference of the cam. A piston restoring spring 46 embodied as a helical compression spring presses the piston 16 with its piston end wall 18 against the circumference of the cam 44 and thus holds the piston 16 in contact with the circumference of the cam 44 during its return stroke. The piston restoring spring 46 is inserted into the piston 16 embodied as a hollow piston and is disposed inside the displacement chamber 26. The piston restoring spring 46 is supported against the inner part 20.

On an end remote from the cam 44, the pump bore 14 is closed by a disk-shaped stopper part 48. The stopper part 48 is fastened in the pump bore 14 and secured in a pressure-tight manner by means of a circumferential caulking 50 of the pump housing 12. The stopper part 48 in turn holds the inner part 20 against its foot 24 in the pump bore 14. The valve closing spring 36 of the outlet valve 30 is supported in an insert against the stopper part 48.

The piston seal 28 which is embodied as a sealing lip, simultaneously functions as a check valve, and fluid can flow past the lip in one direction, the sealing lip is not exclusively limited to being used with a hollow piston 16; the sealing lip can in principle also be used in a piston pump with a conventional piston.

The foregoing relates to preferred exemplary embodiment of the invention, it being understood that other variants and embodiments thereof are possible within the spirit and scope of the invention, the latter being defined by the appended claims.

We claim:

1. A piston pump comprising a piston driven to execute a reciprocating stroke motion, a check valve which controls a fluid flow direction through the piston pump of fluid to be supplied by the piston pump, the piston pump (10) has a piston seal (28) which seals a displacement chamber (26) of the piston pump (10) and constitutes the check valve of the piston pump (10), wherein the piston seal (28) has a sealing lip which permits fluid to flow past when a pressure difference acts on the sealing lip in one direction and which produces a seal in response to a pressure difference in an opposite direction.

2. The piston pump according to claim 1, in which the piston (16) is embodied as a hollow cone and that an inner chamber of the piston (16) constitutes a displacement chamber (26) of the piston pump (10).

3. A piston pump comprising a piston driven to execute a reciprocating stroke motion, a check valve which controls a fluid flow direction through the piston pump of fluid to be supplied by the piston pump, the piston pump (10) has a piston seal (28) which seals a displacement chamber (26) of the piston pump (10) and constitutes the check valve of the piston pump (10), wherein the piston seal (28) has a sealing lip which permits fluid to flow past when a pressure difference acts on the sealing lip in one direction and which produces a seal in response to a pressure difference in an opposite direction, wherein the piston (16) is embodied as a hollow cone and that an inner chamber of the piston (16) constitutes a displacement chamber (26) of the piston pump (10), the piston pump (10) has a stationary inner part (20), which protrudes into an open end of the piston (16), and wherein the piston (16) is moved axially on the inner part (20) and is sealed by the piston seal (28).

4. The piston pump according to claim 3, in which the inner part (20) is a plastic, injection molded part.

5. The piston pump according to claim 3, in which the piston seal (28) is of one piece with the inner part (20).

6. A piston pump comprising a piston driven to execute a reciprocating stroke motion, a check valve which controls a fluid flow direction through the piston pump of fluid to be supplied by the piston pump, the piston pump (10) has a piston seal (28) which seals a displacement chamber (26) of the piston pump (10) and constitutes the check valve of the piston pump (10), wherein the piston seal (28) has a sealing lip which permits fluid to flow past when a pressure difference acts on the sealing lip in one direction and which produces a seal in response to a pressure difference in an opposite direction, wherein the sealing lip (28) is embodied in the shape of a truncated, hollow cone.

* * * * *